US005785916A

United States Patent [19]

Huarng

[11] Patent Number: 5,785,916
[45] Date of Patent: Jul. 28, 1998

[54] PROCESS FOR MAKING MOLDED THERMOPLASTIC POLYURETHANE ARTICLES EXHIBITING IMPROVED UV AND HEAT RESISTANCE

[75] Inventor: Roger Jyh-Chiarng R. Huarng, Northville, Mich.

[73] Assignee: BASF Corporation, Mt. Olive, N.J.

[21] Appl. No.: 742,274

[22] Filed: Oct. 31, 1996

Related U.S. Application Data

[63] Continuation of Ser. No. 547,086, Oct. 17, 1995, abandoned.

[51] Int. Cl.$^6$ .................. C08J 5/00; C08K 3/20; C08L 75/00; C08F 8/30
[52] U.S. Cl. .................. 264/331.13; 264/331.19; 524/91; 524/323; 525/66; 525/123; 525/308; 525/455
[58] Field of Search .................. 264/331.13, 331.19; 525/66, 123, 308, 455; 524/91, 323

[56] References Cited

U.S. PATENT DOCUMENTS 4,317,890  3/1982  Goyert et al. .................. 525/66
5,240,975  8/1993  Winter et al. .................. 524/91

Primary Examiner—Patrick D. Niland
Attorney, Agent, or Firm—James J. Drake

[57] ABSTRACT

Instant invention provides thermoplastic polyurethane compositions comprising one or more thermoplastic polyurethanes A) one or more acrylate based rubbers B), and one or more UV and/or heat stabilizers C), wherein the thermoplastic polyurethane composition of A)+B)+C) has a greater UV stability as compared to a thermoplastic polyurethane composition of A)+C), wherein (a.) UV stability is measured as the difference between (1.) Delta E versus white tile after molded, and (2.) Delta E versus white tile after 1000 hours of QUV (b.) increasing stability is indicated by minimization of the difference between (1.) and (2.).

The invention further provides a process of making molded thermoplastic polyurethane articles using the aforementioned thermoplastic polyurethane compositions.

18 Claims, No Drawings

PROCESS FOR MAKING MOLDED THERMOPLASTIC POLYURETHANE ARTICLES EXHIBITING IMPROVED UV AND HEAT RESISTANCE

This is a continuation, of application Ser. No. 08/547,086 filed Oct. 17, 1995 now abandoned.

BACKGROUND OF THE INVENTION

1. Field of the Invention

The present invention pertains to thermoplastic polyurethane. More particularly, the present invention provides thermoplastic polyurethane compositions which exhibit optimum UV and heat resistance while maintaining desirable performance properties and a process for making molded thermoplastic articles having desirable UV and heat resistance properties.

2. Description of the Related Art

Commercial applications of thermoplastic polyurethane (TPU) continue to grow at a rapid pace. Unlike their thermoset relatives, thermoplastic polyurethanes can be processed in a manner similar to other thermoplastics in operations such as extrusion, injection molding, wire coating, etc. In addition to its desirable processability, TPU finds applicability in a wide variety of end use applications because of its optimum combination of performance properties.

For example, TPU is desirable because of its hardness, tensile strength, modulus, flexibility, and/or tensile elongation. The combination of such physical properties and a ready adaptability to a wide variety of processing and molding parameters results in the use of TPU in numerous end use applications, especially in many consumer goods.

As a result of its use in consumer goods, in addition to optimum processing and performance properties, commercially desirable TPU formulations must be visually appealing, and maintain such desirable visual characteristics over the lifetime of the part. In consumer applications, this often translates into a desire for TPU compositions capable of exhibiting good UV resistance and heat stability.

With respect to heat stability, the TPU composition must not yellow or dull upon exposure to the temperatures normally encountered upon typical TPU composition processing. Typical processing temperatures reach between 380° F. to 420° F. and often result in a light yellow or dull appearance of the final TPU composition containing product. In addition, the part must not yellow or dull upon long term exposure to moderate and higher temperatures encountered during its lifetime. Typical temperatures which may be encountered during part use are from 23° C. to 80° C . It will be appreciated that a yellowed or dulled appearance is detrimental, and in many consumer and automotive applications, unacceptable.

Once a heat stable TPU composition has been achieved, the visually pleasing appearance of the TPU containing product must be maintained over the lifetime of that particular product. That is, upon exposure to outdoor light, and in particular, ultraviolet light, the final product must not exhibit yellowing, dulling, chalking, whitening, or blushing.

Thus, it would be desirable to provide a TPU composition which possesses optimum processability and performance characteristics while still exhibiting good heat stability and resistance to UV degradation. Such a TPU composition would be particularly desirable for use in consumer and automotive applications.

Accordingly, the prior art has long sought such a TPU composition.

For example, PVC has been added to TPU compositions in an attempt to improve UV resistance. However, although performance in UV was improved, such compositions are unacceptable due to poor heat stability, i.e., significant yellowing as a result of initial processing.

JP 06306248 A reports a heat and light resistant resin composition for slush molding, comprising acrylic resin and thermoplastic polyurethane resin. The composition is obtained by dispersing an aliphatic based polyurethane having isocyanate groups which contain a reactive acrylic resin (containing OH), in a dispersing medium and by extending the chain and making it into powder. The composition has tensile strength at least 50 kg/cm$^2$ and elongation at rupture at least 100% as a molded film. The English abstract does not report any heat and/or light resistance data.

EP 459257 discloses a thermoplastic blend of polyurethane and partly cured graft rubber which has good mechanical properties and aging resistance. The thermoplastic flexible composition consists of thermoplastic polyurethane and partly crosslinked graft rubbers based on an acrylate rubber with a core/shell structure and/or a silicone rubber. The partly crosslinked graft rubber has a rubber content of 40–85 weight percent and contains a grafted copolymer of vinyl monomers, preferably styrene, alpha-methylstyrene, acrylonitrile, 1–6 C alkyl methacrylate or vinyl 1–3 C carboxylate. The partly crosslinked graft rubber may have a polybutadiene core, acrylate rubber shell and grafted vinyl monomers. No heat or UV resistance data is reported.

U.S. Pat. No. 5,237,001 discloses a thermoplastic composition which is a blend of A) a thermoplastic polyurethane and B) at least partially cross-linked alkyl acrylate copolymer of a $C_{1-6}$ alkyl acrylate and a monomer selected from the group consisting of acrylonitrile, styrene, vinyl acetate, $C_{1-6}$ alkyl methacrylates, and mixtures thereof.

However, none of the foregoing provide TPU compositions having an optimum blend of heat and light stability in conjunction with traditional TPU performance properties. In particular, none of the foregoing provide TPU compositions having acceptable heat stability properties and resistance to UV degradation. Accordingly, it would be desirable to provide such a composition.

It is thus an object of the invention to provide a TPU composition having an optimum combination of heat and light resistance in conjunction with traditional TPU properties.

SUMMARY OF THE INVENTION

The foregoing objects of the invention are achieved with a thermoplastic polyurethane composition having one or more thermoplastic polyurethanes A), one or more acrylate based rubbers B), and one or more UV and/or heat stabilizers C), wherein the resulting composition of A)+B)+C) has a greater UV stability as compared to a mixture of A)+C), the UV stability being measured as the difference between (1.) delta E versus white tile after molded, and (2.) delta E versus white tile after 1000 hours of QUV, with increasing stability being indicated by minimization of the difference between (1.) and (2.).

More particularly, the invention provides a thermoplastic polyurethane composition having one or more thermoplastic polyurethanes A) prepared using (i) polyetherals and (ii) aromatic isocyanates; one or more acrylate based rubbers B), a core shell structure wherein the core is comprised of a partially crosslinked $C_{1-6}$ alkyl acrylate and a shell comprised of a $C_{1-6}$ alkyl methacrylate; one or more UV and/or heat stabilizers C) comprising an active ingredient which is 2-(2-hydroxy-3,5-di-tert-amyl-phenyl)-2H-benzotriazole, 1,6-hexanediylbis(3-benzotriazol-N-yl)-4-hydroxy-5-tert-butyl) phenyl propionate, and mixtures thereof; wherein the resulting composition of A)+ B)+C) has a 50% greater UV stability as compared to a mixture of A)+C), wherein UV stability is measured as the difference between (1.) delta E versus white tile after molded, and (2.) delta E versus white tile after 1000 hours of QUV, and increasing stability is indicated by a minimization of the difference between (1.) and (2.)

The invention further provides a process for making molded thermoplastic articles having the above-desired UV and heat resistance properties, said process involving the use of the foregoing thermoplastic polyurethane composition.

DESCRIPTION OF THE PREFERRED EMBODIMENTS

The thermoplastic polyurethane composition of the invention requires the use of one or more thermoplastic polyurethanes A), one or more acrylate based rubbers B), and one or more UV and/or heat stabilizers C), and optionally, one or more compatibilizers D), and additives E) selected from the group consisting of lubricants, and inhibitors, stabilizers against hydrolysis, flame retardants, dyes, pigments, inorganic and/or organic fillers and reinforcing agents.

The TPUs A) usable according to the present invention can be prepared by reacting a) organic, preferably aromatic, diisocyanates, in particular 4,4'-diphenylmethane diisocyanate, with b) polyhydroxy compounds, preferably essentially linear polyhydroxy compounds, having molecular weights of from 500 to 800, in particular polyalkylene glycol polyadipates having from 2 to 6 carbon atoms in the alkylene moiety and molecular weights of from 500 to 6000 or hydroxyl-containing polytetrahydrofuran having a molecular weight of from 500 to 8000, and c) diols as chain extenders having molecular weights of from the 60 to 400, in particular 1,4-butanediol, in the presence of d) catalysts and optionally e) aids and/or f) additives at elevated temperatures.

The TPU-forming components (a) to (d) and optionally (e) and/or (f) may be described in detail as follows:

a) Suitable organic diisocyanates (a) are for example aliphatic, cycloaliphatic and preferably aromatic diisocyanates. Specific examples are: aliphatic diisocyanates such as 1,6-hexamethylene diisocyanate, 2-methyl-1×5-pentamethylene diisocyanate, 2-ethyl-1, 4-butylene diisocyanate and mixtures of at least two of said aliphatic diisocyanates, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate and the corresponding isomeric mixtures, 4,4'-,2,4'- or 2,2'- or 2,2'-dicyclohexylmethane diisocyanate and the corresponding isomeric mixtures and preferably aromatic diisocyanates such as 2,4-toluylene diisocyanate, mixtures of 2,4-and 2,6- toluylene diisocyanate, 4,4'-,2,4'- and 2,2'-diphenylmethane diisocyanate, mixtures of 2×4'- and 4×4'-diphenylmethane diisocyanate, urethane-modified liquid 4,4'- and/or 2,4'-diphenylmethane diisocyanates, 4,4'-diisocyanato-1,2-diphenylethane, mixtures of 4,4'-2,4- and 2,2'-diisocyanato-1,2-diphenylethane, preferably those having a 4,4'-diisocyanato-1,2-diphenylethane content of at least 95% by weight, and 1,5-naphthylene diisocyanate. Preference is given to using diphenylmethane diisocyanate isomer mixtures having a 4,4'-diphenylmethane diisocyanate content of greater than 96% by weight and in particular essentially pure 4,4'-diphenylmethane diisocyanate.

b) Preferred polyhydroxy compounds (b) having molecular weights of from 500 to 8000 are polyetherols and in particular polyesterols. However, it is also possible to use other hydroxyl-containing polymers containing ether or ester groups as bridge members, for example polyacetals, such as polyoxymethylenes and in particular water-soluble formals, e.g. polybutanediol formal and polyhexanediol formal, and polycarbonates, in particular those formed from diphenyl carbonate and 1,6-hexanediol, prepared by transesterification. The polyhydroxy compound must be at least predominantly linear, i.e., difunctional within the meaning of the isocyanate reaction. The polyhydroxy compounds mentioned may be used as individual components or in the form of mixtures.

Suitable polyetherols can be prepared from one or more alkylene oxides having from 2 to 4 carbon atoms in the alkylene moiety in a conventional manner, for example by anionic polymerization with alkali metal hydroxides, such as sodium hydroxide or potassium hydroxide, or alkali metal alcoholates, such as sodium methoxide, sodium ethoxide, potassium ethoxide or potassium isopropoxide, as catalysts and in the presence of at least one initiator molecule which contains 2 to 3, preferably 2 reactive hydrogen atoms, or by cationic polymerization with Lewis acids, such as antimony pentachloride, boron fluoride etherate, etc. or bleaching earth, as catalysts.

Preferred alkylene oxides are for example tetrahydrofuran, 1,3-propylene oxide, 1,2-butylene oxide, 2,3-butylene oxide and in particular ethylene oxide and 1,2-propylene oxide. The alkylene oxides may be used individually, alternately in succession or as mixtures. Suitable initiator molecules are for example: water, organic dicarboxylic acids, such as succinic acid, adipic acid and/or glutaric acid, alkanolamines, such as ethanolamine, N-alkylalkanolamines, N-alkyldialkanolamines, e.g. N-methyl- and N-ethyl-diethanolamine, and preferably dihydric alcohols which may contain ether linkages, e.g. ethanediol, 1,2-propanediol, 1,3-propanediol, 1,4-butanediol, diethylene glycol, 1,5-pentanediol, 1,6-hexanediol, dipropylene glycol, 2-methyl- 1,5-pentanediol and 2-ethyl-1,4-butanediol. The initiator molecules may be used individually or as mixtures.

Preference is given to using polyetherols from 1,2-propylene oxide and ethylene oxide in which more than 50%, preferably from 60 to 80%, or the OH groups are primary hydroxyl groups and where at least some of the ethylene oxide units are present as a terminal block. Such polyetherols can be obtained by, for example, polymerizing onto the initiator molecule first the 1,2-propylene oxide and then the ethylene oxide, or first the entire 1,2-propylene oxide mixed with some of the ethylene oxide and then the remainder of the ethylene oxide, or step by step first some of the ethylene oxide, then the entire 1,2-propylene oxide and then the remainder of the ethylene oxide.

Other preferred possibilities are the hydroxyl-containing polymerization products of tetrahydrofuran.

The essentially linear polyetherols have molecular weights of from 500 to 8000, preferably from 600 to 6000, in particular from 800 to 3500, the polyoxytetramethylene glycols preferably having molecular weights of from 500 to 2800. They can be used not only individually but also in the form of mixtures with one another.

Suitable polyesterols may be prepared for example from dicarboxylic acids of from 2 to 12, preferably from 4 to 6, carbon atoms and polyhydric alcohols. Suitable dicarboxylic acids are for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a mixture of succinic acid, glutaric acid and adipic acid. To prepare the polyesterols it may be advantageous to use instead of the dicarboxylic acids the corresponding dicarboxylic acid derivatives, such as dicarboxylic monoesters or diesters having from 1 to 4 carbon atoms in the alcohol moiety, dicarboxylic anhydrides or dicarbonyl dichlorides. Examples of polyhydric alcohols are glycols of from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethylpropane-1,3-diol, 1,3-propanediol and dipropylene glycol. Depending on the properties which are desired, the polyhydric alcohols may be used alone or optionally mixed with one another.

It is also possible to use esters of carbonic acid with the diols mentioned, in particular those having from 4 to 6 carbon atoms, such as 1,4-butanediol and/or 1,6-hexanediol, condensation products of ω-hydroxycarboxylic acids, e.g. ω-hydroxycaproic acid, and preferably polymerization products of lactones, for example substituted or unsubstituted ω-caprolactones.

Preferred polyesterols are ethanediol polyadipates, 1,4-butanediol polyadipates, ethanediol/1,4-butanediol polyadipates, 1,6-hexanediol/neopentylglycol polyadipates, 1,6-hexanediol/1,4-butanediol polyadipates and polycaprolactones.

The polyesterols have molecular weights of from 500 to 6000, preferably from 800 to 3500.

c) Suitable chain extenders (c) having molecular weights of from 60 to 400, preferably from 60 to 300, are preferably aliphatic diols of from 2 to 12 carbon atoms, preferably of 2, 4 or 6 carbon atoms, e.g. ethanediol, 1,6-hexanediol, diethylene glycol, dipropylene glycol and in particular 1,4-butanediol. However, it is also possible to use diesters of terephthalic acid with glycols of from 2 to 4 carbon atoms, e.g. bisethylene glycol terephthalate, 1,4-butanediol terephthalate, and hydroyxalkylene ethers of hydroquinone, e.g. 1,4-di-(β-hydroxyethyl)-hydroquinone, and also polytetramethylene glycols having molecular weights of from 162 to 378.

To set the hardness and the melt flow index, the formative components can be varied within relatively wide molar ratios bearing in mind that the hardness and melt viscosity increase with an increasing level of chain extenders (c) while the melt flow index decreases.

To prepare relatively soft TPUs A), which are especially preferred for use in the instant invention, for example those having a Shore A hardness of less than 95, preferably from 95 to 70, it is advantageous to use the essentially difunctional polyhydroxy compounds (b) and the diols (c) in a molar ratio of from 1:1 to 1:5, preferably from 1:1.5 t 1:4,5, so that the resulting mixtures of (b) and (c) have a hydroxy equivalent weight of greater than 200, in particular form 239 to 450, while greater than 200, in particular form 239 to 450, while harder TPUs (a), for example those having a Shore A hardness of greater than 98, preferably from 55 to 75 hardness of greater than 98, preferably from 55 to 75 Shore D, are prepared using a molar ratios of (b):(c) within the range of 1:5.5. to 1:15, preferably from 1:6 to 1:12, so that the resulting mixtures of (b) and (c) have a hydroxy equivalent weight of from 110 to 200, preferably from 120 to 180.

d) Suitable catalysts, in particular for the reaction between the NCO groups of the diisocyanates (a) and the hydroxyl groups of the formative components (b) and (c), are the customary tertiary amines, such as triethylamine, dimethylcyclohexylamine, N-methylmorpholine, N,N'-dimethylpiperazine, diazabicyclo[2.2.-2]octane and the like, in particular organic metal compounds such as titanic esters, iron compounds, tin compounds, e.g. tin diacetate, tin dioctoate, tin dilaurate or the tin dialkyl salts of aliphatic carboxylic acids such as dibutyltin diacetate, dibutyltin dilaurate and the like. The catalysts are customarily used in amounts of from 0.001 to 0.1 parts by weight per 100 parts by weight of the mixture of polyhydroxy compounds (b) and diols (c).

In addition to catalysts, the formative TPU components may also contain aids (e) and/or additives (f). Examples are lubricants, inhibitors, stabilizers against hydrolysis, flame retardants, dyes, pigments, inorganic and/or organic fillers and reinforcing agents.

To prepare the TPUs A), the formative components (a), (b) and (c) are made to react in the presence of a catalyst (d) and in the presence or absence of aids (e) and/or additives (f) in such amounts that the equivalence ratio of the diisocyanate NCO groups to the total number of hydroxyl groups of components (b) and (c) is from 0.95 to 1.10:1, preferably 0.98 to 1.08:1, in particular approximately 1.0 to 1.05:1.

The TPUs A) which are usable according to the present invention and which customarily contain from 8 to 20% by weight, preferably from 8 to 16% by weight, based on the total weight, of urethane groups and have a melt flow index at 210° C. of from 500 to 1, preferably from 100 to 1, can be prepared by the extruder technique or the belt technique by batch wise or continuous mixing of formative components (a) to (d) and optionally (e) and/or (f), reacting the mixture in an extruder or on a support belt at from 60° to 250° C., preferably at from 70° to 150° C., and then granulating the resulting TPUs A). The reactor extruder technique, such as is well known in the art is most preferred. It may be advantageous to heat the resulting TPU A) at from 80° to 120° C., preferably at from 100° to 110° C., for a period of from 1 to 24 hours before further processing.

The one or more acrylate based rubbers B) of the composition generally comprise an elastomeric graft copolymer with butadiene, butadiene/styrene, butadiene/acrylonitrile and acrylic esters as described for example in DE-A-1 694 173 and DE-A-2 348 377.

Component B) will preferably be a graft polymer formed from 50–90, preferably 60–80, % by weight of an acrylate rubber having a glass transition temperature of below −20°C., as grafting base, and 10–50, preferably 20–40, % by weight of a copolymerizable ethylenically unsaturated monomer whose homopolymers and copolymers have a transition temperature of more than 35° C., as graft superstratum. With respect to graft copolymers having a core/shell structure, the term 'grafting base' is understood to refer to the composition of the core, while the term 'graft superstratum' is understood to refer to the composition of the shell.

The grafting base comprises acrylate or methacrylate rubbers which may contain 0 to 40% by weight of further comonomers. The $C_1$–$C_8$-esters of acrylic or methacrylic acid and halogenated derivatives thereof, and also aromatic acrylic esters and mixtures thereof are preferred. Suitable comonomers for the grafting base are acrylonitrile, methacrylonitrile, styrene, α-methylstyrene, acrylamides, methacrylamides and also vinyl $C_1$–$C_6$ alkyl ethers.

The grafting base may be uncrosslinked or partially or completely crosslinked. The crosslinking is produced by copolymerizing preferably 0.02–5% by weight, in particular 0.05–2% by weight, of a crosslinking monomer having more than one double bond. Suitable crosslinking monomers are described for example in DE-A-2726 256 and EP-A-50 265.

Preferred crosslinking monomers are triallyl cyanurate, triallyl isocyanurate, triacryloylhexahydro-s-tria-zine and trialkylbenzenes.

If the crosslinking monomers have more than 2 polymerizable double bonds, it is advantageous to limit their amount to not more than 1% by weight, based on the grafting base.

Suitable grafting bases are emulsion polymers having a gel content of more than 60% by weight (as determined in dimethylfornamide at 25° C. by the method of M. Hoffman, H. Kromer, R. Kuhn, Polymeranalytik, George-Thieme-Verlag, Stuttgart, 1977).

Other suitable grafting bases are acrylate rubbers having a diene core, as described for example in EP-A-50 262.

Suitable graft monomers are in particular styrene, α-methylstyrene, acrylonitrile, methacrylonitrile, methyl methacrylate and mixtures thereof, in particular mixtures of styrene and acrylonitrile in a weight ration of 90/10 to 50/50. An especially preferred graft monomer is methyl methacrylate.

The graft yield, i.e. the ration of the amount of grafted-on monomer to the amount of graft monomer used, is in general within the range from 20 to 80%.

Rubbers based on acrylates which may be used according to the present invention are described for example in DE-A-2 444 584 and DE-A-2 726 256. Particularly s preferred acrylate rubbers are the $C_{1-10}$ alkyl acrylates.

It is of course the case that it is also possible to use mixtures of the abovementioned types of rubber.

The graft superstratum may be produced in one or more, namely up to 4, stages.

The graft rubbers are prepared in a conventional manner by emulsion polymerization.

Most preferably, the one or more acrylate based rubbers B) will generally have from 30 to 90%, and preferably from 40 to 85% of a $C_{1-10}$ alkyl acrylate. Preferably, the alkylacrylate will be a $C_{1-6}$ alkyl acrylate and more preferably, either propyl, butyl, or hexyl acrylate, with butyl being especially preferred. The 30 to 90% $C_{1-10}$ alkyl acrylate will generally be present in conjunction with one or more monomers selected from the group consisting of styrene, acrylonitrile, vinyl acetate and/or $C_{1-6}$ alkylalmethacrylates. Preferred monomers are acrylonitrile, styrene, and methyl methacrylate. Methyl methacrylate is especially preferred. Such monomers are generally present in amounts of from 50 to 10% by weight and more particularly, 40 to 20% by weight.

As indicated above, most preferably, the one or more acrylate based rubbers B), will be present in the form of a graft copolymer having a core/shell structure. Those skilled in the art will appreciate that in such a structure, the 30 to 90% $C_{1-10}$ alkylacrylate will generally form the partially or totally crosslinked inner core structure, with the one or more monomers selected from the group consisting of styrene, acrylonitrile, vinyl acetate, and/or $C_{1-6}$ alkyl methacrylates forming the enveloping outer shell structure.

Examples of suitable commercially available materials are those from Rohm & Haas' Paraloid®[1] line, especially KM 334, KM 390, EXL 3330 and EXL 3361.

[1]Paraloid® is a registered trademark of Rohm & Haas

The most referred core/shell graft products may be obtained via polymerization of the foregoing monomers in the presence of an elastomer component prepared in a separate polymerization step. The graft products may be produced by non-polymerization processes, including emulsion, suspension and bulk polymerization and combinations of these processes.

Alternatively, the one or more acrylate based rubbers may be in the form of copolymers or terpolymers. It will be appreciated by those skilled in the art that in general such materials will not have the preferred core/shell structure discussed above. An example of an illustrative commercially available material is Goodyear Chemicals' Sunigum®[2].

[2]Sunigum® is a registered trademark of Goodyear Chemical

The one or more UV and/or heat stabilizers C) are additives which will preferentially absorb and dissipate energy by relieving excited molecules of excess energy and releasing it as heat. In general, the stabilizers preferred for use herein will be effective in the range of from 300 to 360 nm. An example of suitable UV and heat stabilizers are derivatives of o-hydroxybenzophenone, o-hydroxyphenyl salicylates, 2-(o-hydroxyphenyl)-benzotriazoles, and hindered phenols.

Also suitable for use herein as UV and heat stabilizers are hindered amine light stabilizers.

Preferred UV stabilizers are those having active ingredients which are sterically hindered benzotriazol type stabilizers. It will be appreciated that many UV stabilizers are concentrates containing other materials in addition to the active ingredient. Particularly preferred active ingredients for UV and heat stabilizers are 2-(2-hydroxy-3,5-di-tert-amyl-phenyl)-2H-benzotriazole, 1,6-hexanediylbis(3-benzotriazol-N-yl)-4-hydroxy-5-tert-butyl) phenyl propionate, and mixtures thereof In particular, the most preferred one or more UV and/or heat stabilizers C) for use in the instant invention will be stabilizer concentrates containing the aforementioned most preferred active ingredients. Such stabilizer concentrates will preferably further contain thermoplastic polyurethanes (TPU) and 1,3,5-triglycidyl-isocyanurate. Such stabilizer UV stabilizer concentrates are discussed in DE 4211335 A, herein incorporated by reference. The most preferred UV and heat stabilizer concentrates will contain approximately 40 to 80 weight percent of thermoplastic polyurethanes, 10 to 30 weight percent 1,3,5-triglycidyl-isocyanurate and 10 to 30 weight percent 2-(2-hydroxy-3,5-di-tert-amyl-phenyl)-2H-benzotriazole, 1,6-hexanediylbis(3-benzotriazol-N-yl)-4-hydroxy-5-tert-butyl) phenyl propionate, or mixtures thereof.

In addition, the thermoplastic polyurethane compositions of the invention may further optionally contain one or more compatibilizing polymers D). Such compatibilizers are generally comprised of copolymers formed from styrene, alphamethylstyrene, acrylonitrile, methacrylonitrile, butadiene, acrylate, and mixtures thereof. Preferred compatibilizers are poly(styrene-acrylonitrile) and ABS. Especially preferred is poly(styrene-acrylonitrile).

Finally, the thermoplastic polyurethane compositions of the invention may further optionally contain additives E) selected from the group consisting of lubricants, inhibitors, stabilizers against hydrolysis, flame retardants, dyes, pigments, inorganic and/or organic fillers and reinforcing agents. Particularly preferred additives E) are dyes and pigments. Titanium dioxide is a commonly used pigment. Of course, those skilled in the art will appreciate that the incorporation of such dyes and pigments depends upon the desired appearance of the end use application.

With respect to the foregoing components of the thermoplastic polyurethane compositions of the invention, such compositions will preferably contain from 50 to 100% of one or more thermoplastic polyurethanes A), from greater than 10 to 49% of one or more acrylate based rubbers B), and from 0.1 to 5.0% of active ingredients of one or more UV and/or heat stabilizers C), as based on the total combined weight of A), B) and (C).

More preferably, the thermoplastic polyurethane compositions of the invention will contain from 60 to 80% of one or more thermoplastic polyurethanes A), from greater than 20 to 40% of one or more acrylate based rubbers B), and from 1.0 to 4.0% of active ingredient of one or more UV and/or heat stabilizers C), as based on the total combined weight of A), B) and C).

If the thermoplastic polyurethane composition of the invention also comprise compatibilizing polymer D), such polymer D) should be present in an amount of from 1 to 10% as based on the total weight of A), B), C) and D). More preferably, the hermoplastic polyurethane composition comprising compatibilizing polymer D) will contain less than 5% of polymer D), and most preferably, will comprise from 2 to 4% of compatibilizing polymer D). It will be appreciated that additives E) will be present in amounts dependent upon the desired end properties of the molded articles.

It will be appreciated that in the instant invention, the thermoplastic polyurethane composition is a blend wherein the predominant matrix is comprised of thermoplastic polyurethane A). Dispersed in said matrix are particles of one or more acrylate based rubbers B). If present, compatibilizing polymer D) will serve as the interface between said acrylate based rubber particles and the TPU matrix. Also interspersed within the matrix TPU will be UV and/or heat stabilizers C). It will be appreciated by those skilled in the art that the incorporation of materials B) and C) will ideally not detract from the performance properties of TPU A).

Molded thermoplastic polyurethane articles made of the thermoplastic polyurethane compositions of the invention may be made by introducing the compositions disclosed herein into a mold such as those known to those skilled in the art and subjecting the composition to processing temperatures such as those disclosed above. The composition will be maintained in the mold subject to said elevated heating conditions for a time sufficient to result in a molded article.

In general, molded thermoplastic polyurethane articles made of thermoplastic polyurethane compositions of the invention should have a Shore hardness of from 60A to 74D, and most preferably from 65A to 95A. The articles should further have a modulus (300%) of from 750 psi to 5000 psi and most preferably from 1200 psi to 3000 psi while the 100% modulus of the molded articles of the invention should be from 500 psi to 5000 psi, and most preferably from 750 psi to 2000 psi. The elastic modulus should be from 750 psi to 6000 psi, and most preferably from 1000 psi to 4000 psi, while the percent elongation should be from 250% to 1000% and most preferably from 400% to 800%.

With respect to heat stability measurements, such will generally be measured as indicated in the following working examples. In particular, delta E should be measured versus white tile provided by the manufacturer of an appropriate spectrophotometer as illustrated below. Initial measurements should be post molding. Ideally, delta E versus white tile after molding should be as low a number as possible, and preferably less than 10, and most preferably less than 8 and preferably less than or equal to 6.

In addition, heat stability should be measured as delta E versus white tile after 14 days at 100° C, i.e. after accelerated testing. This number should preferably be less than 18 and most preferably less than or equal to 15 with numbers less than or equal to 14 being most preferred.

In addition to the foregoing heat stablity values, those skilled in the art will appreciate that the difference between (delta E vs white tile after molding) and (delta E vs white tile after 14 days at 100 degrees C) is particularly important with respect to desireable performance. This difference, which for the purposes of the instant invention may be termed 'delta HS', should be as small as possible, with desireable delta HS values being less than or equal to 10, but preferably less than 8, and most preferably less than 5.

With respect to measurements of UV stability, such should be measured using a commercially available QUV instrument provided by Q Panel. Delta E versus white tile after 1000 hours of QUV is an appropriate measurement of UV stability. 1000 hours of QUV means 1000 hours of exposure in a QUV instrument, which simulates the long-term effect of UV weathering on a material during a compressed period of time Delta E values should be less than 20, preferably less than 15 and ideally less than or equal to 10.

In addition to the foregoing UV stablity values, those skilled in the art will appreciate that the difference between (delta E vs white tile after molding) and (delta E vs white tile after 1000 hours QUV) is particularly important with respect to desireable performance. This difference, which for the purposes of the instant invention may be termed 'delta UVS', should be as small as possible, with desireable delta UVS values being less than or equal to 8, but preferably less than 6, and most preferably less than or equal to 4.

Finally, it will be appreciated that the sum of both delta HS and delta UVS will ideally be minimized as much as possible. Such minimized values represent an optimum level of both UV and heat stability.

The invention will now be illustrated by the following working examples, which are not to be construed as limiting the scope of the invention.

WORKING EXAMPLES

Ellastollan®[3] E1180A-10 E1180A-50, and E1185A-10 are commercially available TPU compositions available from BASF Corporation of Wyandotte, Mich. All three TPU compositions comprise the reaction product of polyetherols and aromatic isocyanates. Tinuvin 328 is a commercially available UV stabilizer. The TiO$_2$ used was commercially available from DuPont as TI PURE R-103.

[3]Ellastolan® is a registered trademark of Elastogram Gmbh.

Sample preparation

All ingredients were mixed in a mixer to form a dry blend. The dry blend was extruded by a Brabender twin-screw mixer (L/d=15/1) and pelletizing die @ 75 rpm with the following temperature profile.

Zone #1: 370 F

Zone #2: 380F

Zone #3: 390F

Die: 390F

Melt: 400–410F

The blends were injection molded into 4"×6"×0.08" plaques on a Cincinnati 110-ton machine with the following temperature profile:

Zone #1: 370F
Zone #2: 380F
Zone #3: 390F
Nozzle: 400F article having a greater UV stability as compared to a molded article made of a thermoplastic composition of A)+C), wherein (a.) UV stability is measured as the difference between (1.) delta E vs. white tile after

TABLE 1

|  | Example #1 | Example #2 | Example #3 | Example #4 | Example #5 | Example #6 | Example #7 |
|---|---|---|---|---|---|---|---|
| Comp. A (TPU) | E1180A-10 (100 wt %) | E1180A-10 (100 wt %) | E1180A-50 (80 wt %) | E1180A-50 (60 wt %) | E1180A-50 (80 wt %) | E1180A-50 (60 wt %) | E1185A-10 (100 wt %) |
| Comp B (other polymer) | None | None | PVC (Apex 584, 20 wt %) | PVC (Apex 584, 40 wt %) | Acrylic Rubber (Paraloid EXL-3330, 20 wt %) | Acrylic Rubber (Paraloid EXL-3330, 40 wt %) | None |
| Comp C (UV stabilizer) | None | Tinuvin 328 (3.5 phr) | Tinuvin 328 (3.5 phr) | Tinuvin 328 (3.5 phr) | Tinuvin 328 (2.8 phr) | Tinuvin 328 (2.1 phr) | Conc. 929 (4 phr) |
| Comp E (pigment) | $TiO_2$ (2.5 phr) | $TiO_2$ (2.5 phr) | $TiO_2$ (2.5 phr) | $TiO_2$ (2.5 phr) | $TiO_2$ (2.5 phr) | $TiO_2$ (2.5 phr) | $TiO_2$ (2.5 phr) |

The plaques prepared in Examples 1–7 were tested for heat and UV resistance/stability according to the following test parameters. Hardness was tested per ASTM D2240 and tensile properties per ASTM D412.

Uv Stability

UV stability was measured on QUV Testing Equipment commerially available from Q-PANEL with a UV A-351 lamp according to ASTM G-53. The test cycles were of 4 hrs UV exposure @60 C, followed by 4 hrs condensation @50 C.

Heat Stability

Heat stability was measured on a DATACOLOR 3890 Spectrophotometer with a port #27 viewing port. White Tile provided by DATACOLOR was used as the standard for delta E calculation.

TABLE 2

| | | | | | | | |
|---|---|---|---|---|---|---|---|
| ΔE vs. white tile after molded | 6 | 7 | 14 | 12 | 6 | 6 | 5 |
| ΔE vs. white tile after 1000 hrs of QUV | 36 | 15 | 14 | 14 | 10 | 9 | 15 |
| ΔE vs. white tile after 14 days @ 100° C. | N/A | 15 | 30 | 30 | 14 | 13 | N/A |
| Hardness (Shore A) | 80 | 78 | 81 | 84 | 82 | 83 | 87 |
| 300% Modulus (psi) | 1500 | 1600 | 1780 | 1360 | 1590 | 1620 | 1600 |
| 100% Modulus (psi) | 800 | 790 | 910 | 980 | 780 | 810 | 950 |
| Elastic Modulus (psi) | 1700 | 1360 | 1740 | 2480 | 1640 | 2280 | 2700 |
| Elongation (%) | 600 | 870 | 630 | 520 | 690 | 590 | 650 |

We claim:

1. A process for making a molded thermoplastic polyurethane article, comprising:
   providing a thermoplastic polyurethane composition, comprising:
   A) one or more thermoplastic polyurethanes;
   B) one or more acrylate based rubbers; and
   C) one or more UV stabilizers having a benzotriazole active ingredient combined with one or more heat stabilizers having a phenol active ingredient; and
   introducing the composition into a mold for a time sufficient to produce a molded article of A)+B)+C), said molded, and (2.) delta E. vs. white tile after 1000 hours of UV exposure.

2. The process of making a molded thermoplastic polyurethane article of claim 1, wherein the thermoplastic polyurethane composition further comprises:
   D) one or more compatilizing polymers.

3. The process of making a molded thermoplastic polyurethane article of claim 1, wherein thermoplastic polyurethane composition contains one or more thermoplastic polyurethanes A) prepared using polyhydroxy compounds selected from the group consisting of polyetherols and polyesterols.

4. The process of making a molded thermoplastic polyurethane article of claim 1, wherein the thermoplastic polyurethane composition contains one or more thermoplastic polyurethanes A) prepared using aromatic isocyanates.

5. The process of making a molded thermoplastic polyurethane article of claim 1, wherein the thermoplastic polyurethane composition contains one or more thermoplastic polyurethanes A) prepared using diphenylmethane diisocyanate.

6. The process of making a molded thermoplastic polyurethane article of claim 1, wherein the thermoplastic polyurethane composition contains acrylate based rubbers having a Tg less than −10 degrees C.

7. The process of making a molded thermoplastic polyurethane article of claim 5, wherein the thermoplastic polyurethane composition contains acrylate based rubbers having from 40 to 85% $C_{1-6}$ alkyl acrylate by the by weight of the acrylate based rubber.

8. The process of making a molded thermoplastic polyurethane article of claim 7, wherein the thermoplastic polyurethane composition contains acrylate based rubbers having a core/shell structure.

9. The process of making a molded thermoplastic polyurethane article of claim 8, wherein the thermoplastic polyurethane composition contains acrylate based rubbers having a core comprised of a partially crosslinked $C_{1-6}$ alkyl acrylate and a shell comprised of a $C_{1-6}$ alkyl methacrylate.

10. The process of making a molded thermoplastic polyurethane article of claim 1, wherein the thermoplastic polyurethane composition contains UV stabilizers C) comprising an active ingredient which is 2-(2-hydroxy-3,5-di-tert-amyl-phenyl)-2H-benztriazole, 1,6-hexanediylbis(3-benztriazol-N-yl)-4-hydroxy-5-tert-butyl) phenyl propionate or mixtures thereof.

11. The process of making a molded thermoplastic polyurethane article of claim 10, wherein the thermoplastic polyurethane composition contains UV stabilizers C) further comprising 1,3,5-triglycidyl-isocyanurate.

12. The process of making a molded thermoplastic polyurethane article of claim 1 wherein the thermoplastic polyurethane composition further comprises a compatiblizing polymer D).

13. The process of making a molded thermoplastic polyurethane article of claim 12 wherein the thermoplastic polyurethane composition further comprises from 1 to 10% of compatibilizing polymer D), as based on the total weight of A), B), C), and D).

14. The process of making a molded thermoplastic polyurethane article of claim 13 wherein the thermoplastic polyurethane composition further comprises less than 5% of compatibilizing polymer D), as based on the total weight of A), B), C), and D).

15. The process of making a molded thermoplastic polyurethane article of claim 14 wherin the thermoplastic polyurethane composition further comprises 2 to 4% of compatibilizing polymer D), as based on the total weight of A), B), C), and D).

16. The process of making a molded thermoplastic polyurethane article of claims 12 or 14 wherein the thermoplastic polyurethane composition contains a compatiblizing polymer D) which is an acrylonitrile/styrene copolymer.

17. The process of making a molded thermoplastic polyurethane article of claim 1, wherein the resulting molded thermoplastic polyurethane article has a 50% greater UV stability than a molded article made of a thermoplastic composition of a mixture of A)+C), wherein (a.) UV stability is measured as the difference between (1.) delta E vs. white tile after molded, and (2.) delta E. vs white tile after 1000 hours of QUV, and (b.) increasing stability is indicated by minimization of the difference between (1.) and (2.).

18. A process for making a molded thermoplastic polyurethane article, comprising:

providing a thermoplastic polyurethane composition, comprising:

A) one or more thermoplastic polyurethanes comprising the reaction product of (I) polyetherols and (ii) aromatic isocyanates;

B) one or more acrylate based rubbers having a core comprised of a partially crosslinked $C_{1-6}$ alkyl acrylate and a shell comprised of a $C_{1-6}$ alkyl methacrylate; and C) one or more UV stabilizers combined with one or more heat stabilizers comprising an active ingredient which is 2-(2-hydroxy-3,5-di-tert-amyl-phenyl)-2H-benzotriazole, 1,6-hexanediylbis(3-benztriazol-N-yl)-4-hydroxy-5-tert-butyl) phenyl propionate and mixtures thereof; and introducing the composition into a mold for a time sufficient to produce a molded article of A)+B)+C), said article having a 50% greater UV stability than a molded article made of a thermoplastic polyurethane composition of A)+C), wherein (a.) UV stability is measured as the difference between (1.) delta E vs. white tile after molded, and (2.) delta E. vs. white tile after 1000 hours of UV exposure.

* * * * *